United States Patent [19]
Radford

[11] 3,945,007
[45] Mar. 16, 1976

[54] RADAR SYSTEMS
[75] Inventor: Matthew Frederick Radford, Chelmsford, England
[73] Assignee: The Marconi Company Limited, Chelmsford, England
[22] Filed: Apr. 7, 1972
[21] Appl. No.: 241,997

[30] Foreign Application Priority Data
Apr. 7, 1971  United Kingdom............... 8945/71

[52] U.S. Cl........... 343/6 R; 343/11 R; 343/100 SA
[51] Int. Cl.²............................................. G01S 9/06
[58] Field of Search.............. 343/6 R, 11 R, 100 SA

[56] References Cited
UNITED STATES PATENTS
3,266,038  8/1966  Milne et al..................... 343/11 R X
3,662,385  5/1972  Nicolas et al............. 343/100 SA X

*Primary Examiner*—T. H. Tubbesing
*Attorney, Agent, or Firm*—Baldwin, Wight & Brown

[57]  ABSTRACT

A within-pulse radar having an array of aerial elements each of which feeds signals to a storage filter via a frequency changing stage, in which the outputs from alternate filters are combined in one channel and the outputs from the remaining filters are combined in another channel which includes a switchable phase shifter which introduces a phase shift of 0° or 180° and which is switched during each pulse length, results in improved separation of scanning and grating lobes. The outputs from the two channels are combined for utilization.

5 Claims, 6 Drawing Figures

RADAR SYSTEMS

This invention relates to radar systems and more specifically to those employing what is now known as "within-pulse" scanning. For brevity of reference such Radar systems will hereinafter be referred to as "within-pulse radars."

In a within-pulse radar, a pulse of pre-determined length ($t$) is periodically transmitted with a pulse repetition period (T) which is long in relation to the pulse length and is preferably and in the simplest case, a large multiple of the pulse length, e.g., $t$ might be 2.5 $\mu$ sec. and T might be 2.5 m sec. The transmitted pulse illuminates the volume to be surveyed. The receiving equipment operates to quantise both target range and target direction information, the small zone of range — i.e., the "range zone" — in which a reflecting target is present being determined by determining the time after the commencement of a pulse period T at which the receiver responds to an echo from the target, this time being measured in terms of the number of pulse lengths $t$ equal to the elapsed time between the commencement of a pulse period and the instant of receiver response. Target direction information (also quantized) is given in terms of the time within the pulse length $t$ corresponding to the target range zone in which maximum receiver response occurs. Thus, in the case of a radar designed to survey a sector extending from 0° to 90° and made up of 90 distinguishable values each of an angle of 1°, a target present in (say) the 40th range zone and in a direction of 30° would produce a receiver response during the 40th pulse length time $t$ from the beginning of a pulse period and one third of the way along that pulse length time.

The nature of the invention will be more clearly understood by reference to the accompanying drawings, of which FIG. 1 shows diagrammatically and sufficiently for the present purpose of explanation, part of the receiving portion of a typical known within-pulse Radar.

Figure 1:
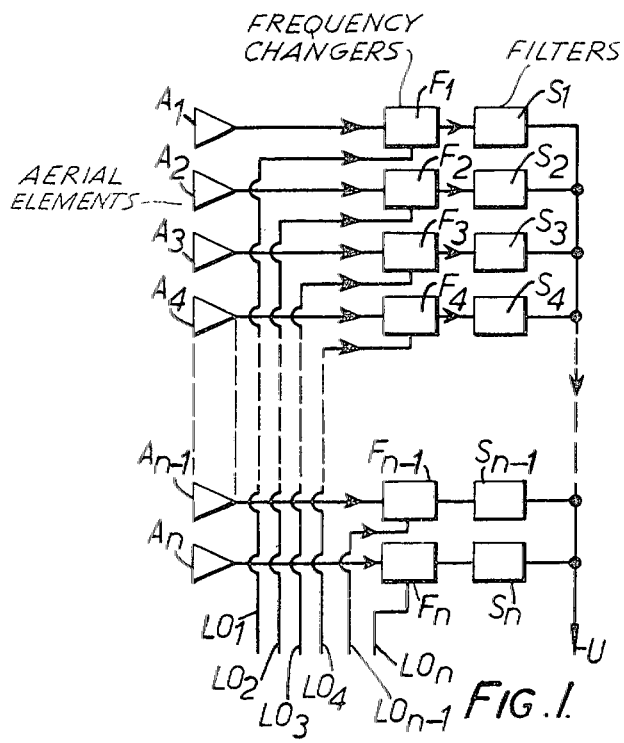

Referring to FIG. 1 the receiving aerial array consists of a large number of aerial elements $A_1$ to $A_n$ which may be of any suitable known type, e.g., as shown, radio horns, arranged side by side and each having an angle of view at least equal to the surveillance angle (e.g., 90°). Each aerial element feeds into one of the similar units $F_1$ to $F_n$ each of which includes a frequency changing stage and such amplification means as may be required. The local oscillations fed to the different frequency changers are, however, not the same but differ from one another by the reciprocal $1/t$ of the pulse length $t$. The local oscillations are produced by means (not shown) and are applied at terminals $LO_1$ to $LO_n$. Thus, if the local oscillation applied to the frequency changer at $F_1$ is $f_o$ those applied to the frequency changers at $F_2 F_3 \ldots F_n$ could be $f_o - 1/t; f_o - 2/t; \ldots f_o - n/t$ respectively. Each unit $F_1$ to $F_n$ feeds into a filter $S_1$ to $S_n$ having a bandwidth of $1/t$ and the outputs of all these filters are combined and taken off for utilization and information extraction in any known desired manner. As the present invention is not concerned with such utilization and information extraction, no description thereof is deemed necessary herein.

Figure 2:
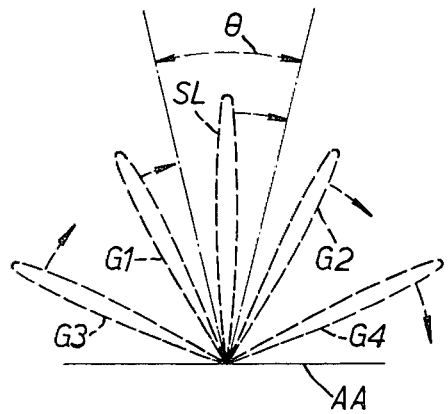
FIGS. 2 and 3 represent schematically the grating lobes resulting from two different orientations of the scanning lobe.
Figure 3:
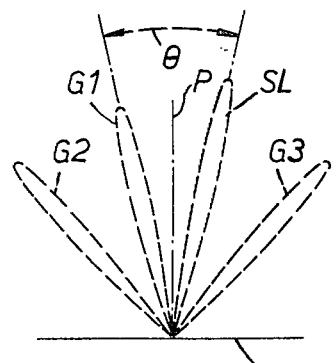

With an arrangement as shown in FIG. 1 the array will produce a sharply directional scanning lobe which swings over an angle $\theta$, this angle, which is herein termed "the scanning angle," depending on the wavelength $\lambda$ and the separation $d$ between the centers of adjacent aerial elements as given by the equation:

$$\sin \theta/2 = \lambda/2d$$

the bisector of the angle $\theta$ being perpendicular to the plane of the array. However if, as is normally the case in practice, $\theta$ is less than 180°, the array will produce, in addition to the lobe already mentioned and herein referred to as the scanning lobe, at least one additional lobe which sweeps in the same direction as the scanning lobe. These additional lobes are known as and will herein be termed "grating" lobes. The number of grating lobes depends upon the aerial element spacing, increasing therewith, and because of the desirability of reducing the number of aerial elements and signal channels fed individually thereby as much as possible, there are usually, in a practical case, several grating lobes. Thus, to take a random practical example, a known radar as illustrated by FIG. 1, wherein the aerial element spacing is 2.2$\lambda$ and $\theta$ is 26°, there will be, when the scanning lobe direction is perpendicular to the plane of the array, four grating lobes, two on one side of the scanning lobe at angles of (approximately) 27° and 66° thereto and two on the other side of the scanning lobe also at angles of (approximately) 27° and 66° thereto. This is illustrated diagrammatically in FIG. 2 of the accompanying drawings in which AA represents the plane of the aerial array, SL represents the scanning lobe and G1 to G4 the grating lobes. When, in scanning, the scanning lobe SL has reached the end of the angle of scan, i.e., is at 13° to the perpendicular to the array, then, as shown in FIG. 3 of the accompanying drawings, there will be three grating lobes of which G1 is just entering the scan angle $\theta$ — i.e., is at 13° to the perpendicular (P in FIG. 3) to the array — and the other two, G2 and G3 are on opposite sides of the perpendicular, at (approximately) 43° thereto. Thus, in this particular example (which is, of course, only one of many) a grating lobe will begin to scan across the scanning angle $\theta$ just when the scanning lobe is leaving it.

As will now be apparent, unwanted scanning lobes are a source of ambiguity and difficulty. Especially is this so if an attempt is made to use a within-pulse radar to scan in the vertical plane for ascertaining the elevation or height of a target instead of in the horizontal plane to determine its azimuth or bearing. Indeed the difficulties are such that, so far as the present applicants are aware, within-pulse radars have not, in practice, yet been able to be applied satisfactorily for target elevation and height determination for the difficulties in such an application are even greater than they they are in the case of scanning in the horizontal plane, for the required angle ($\theta$) of surveillance is usually small and extends from the horizontal, or near horizontal, upwards. Suppose it were required, for target elevation determination, to sweep over an angle of 26° extending upwards from the horizontal. For such a purpose the aerial array would be erected with its plane at 13° to the vertical so that the perpendicular to the array would be inclined upwards at 13° to the horizontal. Because of ground reflection and similar effects any grating lobe anywhere near the horizontal, even though its theoretical direction was inclined downwards below the horizontal to a quite substantial extent, would be liable to result in reflected interfering and ambiguity causing signals coming back into the receiving array. In addition — and this difficulty applies to scanning in the horizontal plane and in the vertical plane alike — it is in practice difficult to the point of impossibility to limit the transmitter illumination of targets really sharply to a desired angle of surveillance. If the illuminated angle is to cover the whole desired angle of scan it will inevitably cover, to some extent, more than that angle if only by a few degrees on each side of the limiting radii. Accordingly a grating lobe directed outside the angle of scan, but near the limits thereof, will be liable to produce returned received target signals with consequent interference and ambiguity.

The present invention seeks to overcome the foregoing difficulties and to provide improved within-pulse radars, and especially improved within-pulse radars which can be employed satisfactorily for target height or elevation determination, which shall be such that undesired grating lobes shall be spaced angularly so far from a desired scanning lobe that, when the latter is scanning across a desired angle of scan, there is no grating lobe in that angle or sufficiently near the limits of that angle to cause ambiguity or interference.

According to this invention a within-pulse radar includes an aerial array consisting of aerial elements so spaced from one another as substantially to satisfy the equation $\sin \theta/2 = \lambda/2Kd$; means for deriving, from the signals received upon the different elements, signals which differ from one another in frequency by $1/Kt$; $K$ signal channels fed with the derived signals, each of said channels being fed with signals derived from $1/K$ of said elements, the signals derived from adjacent elements being fed cyclically to different channels; phase switching means actuated at least once during each pulse length for simultaneously switching the phases of the signals in the channels in such manner that, at each switching operation, the phase in the channel switched thereby shifts by $2\pi/K$ or a multiple thereof, the shifts simultaneously produced in the different channels being different; and means for combining the signals obtained from the channels after phase switching to provide signals for utilization and target information determination: where $\theta$ is a pre-determined angle of scan, $\lambda$ is the wave length, $d$ is the element spacing, $t$ is the pulse length, and $K$ is an integer.

Preferably and in the simplest case $K$ is 2. It may, however, be a higher integer, for example 3.

According to a feature of this invention a within-pulse radar comprises an aerial array consisting of aerial elements spaced so as substantially to satisfy the equation $\sin \theta/2 = \lambda/4d$; as many frequency changers as there are elements each fed from a different element; means for applying to the frequency changers fed from adjacent elements local oscillation frequencies differing by one-half the reciprocal of the pulse length, all the local oscillation frequencies being different; as many filters as there are frequency changers each fed from a different frequency changer; two signal channels, one fed from the filters following the frequency changers fed from alternate elements and the other fed from the remaining filters; a phase shifter providing a phase shift of $\pi$; means for switching said phase shifter into or out of one of the channels at least once in each pulse length; and means for combining the signals from the two channels to provide signals for utilisation and target information determination. AS will be seen, in a radar in accordance with this feature of the invention the above mentioned integer $K$ is 2.

As already stated the invention is particularly applicable to and intended for providing target elevation or height information and lends itself admirably to the provision of an elevation or height finding within-pulse radar in an otherwise ordinary known radar installation in which target azimuth and range determination is obtained in accordance with ordinary known practice, e.g., in which azimuth scanning is effected by an aerial system which is rotated in azimuth. In a preferred form of radar installation which includes both a known radar for finding and displaying target range and azimuth, and includes an azimuth rotating aerial system and a height or elevation finding within-pulse radar in accordance with this invention, means, known per se, are preferably provided for selecting individual displayed targets and gating means actuated by said selecting means are provided in a channel to which the utilisation signals from said within-pulse radar are fed so that said channel is opened only when signals from a selected target are received by the aerial array of the within-pulse radar which is rotated in azimuth synchronously with the aforesaid azimuth rotating aerial system.

Figure 4:
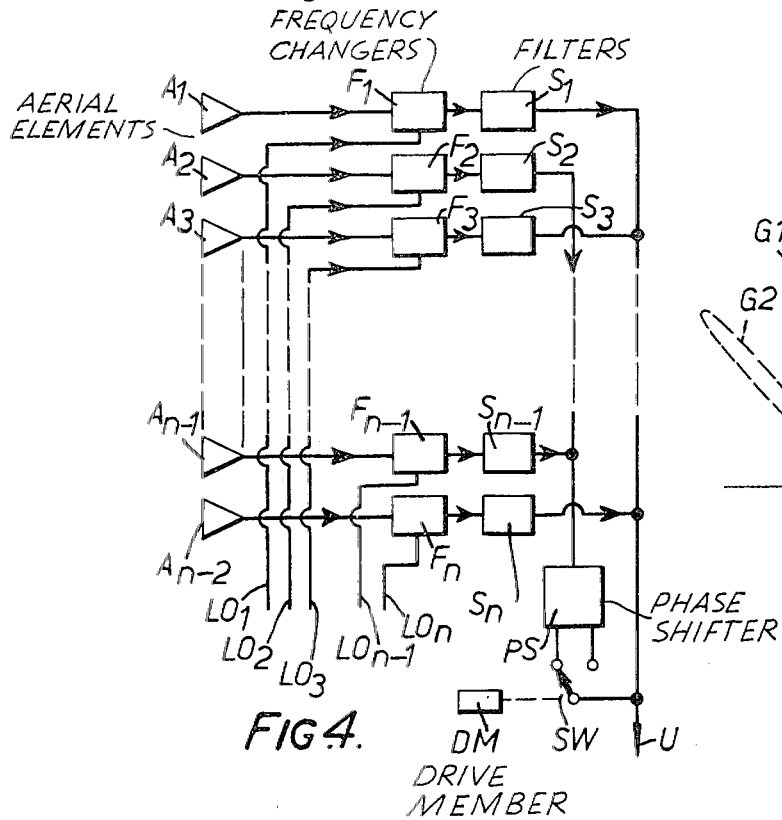
FIGS. 4 and 5 show part of the receiver portion of two embodiments of the invention.
Figure 5:
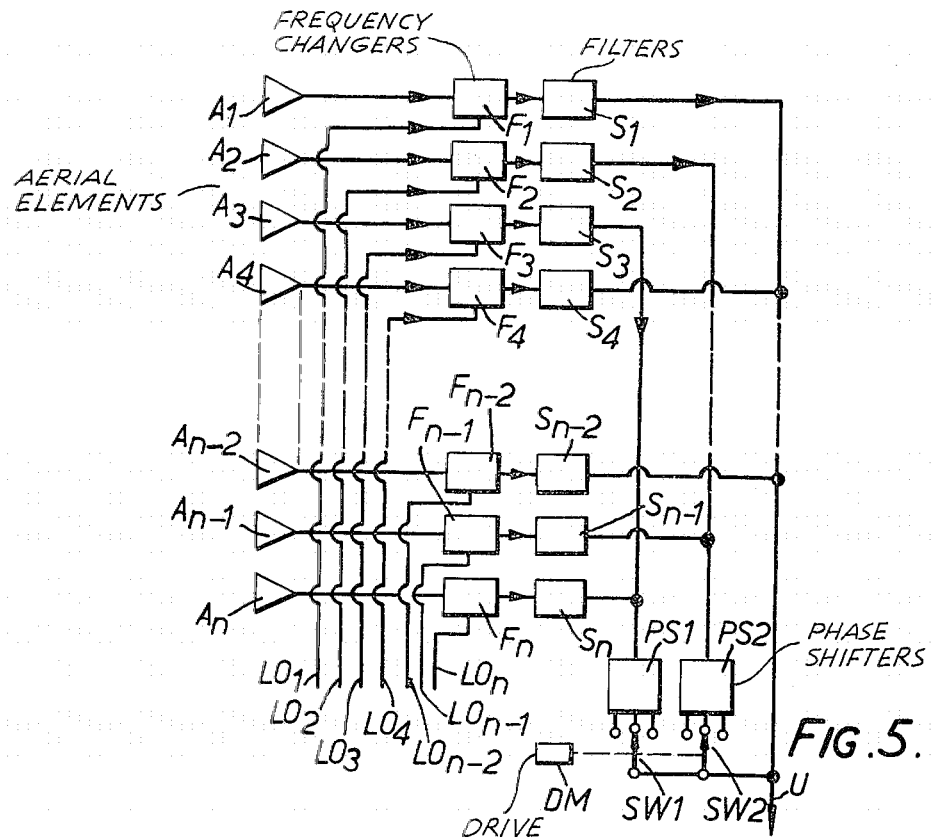
Figure 6:
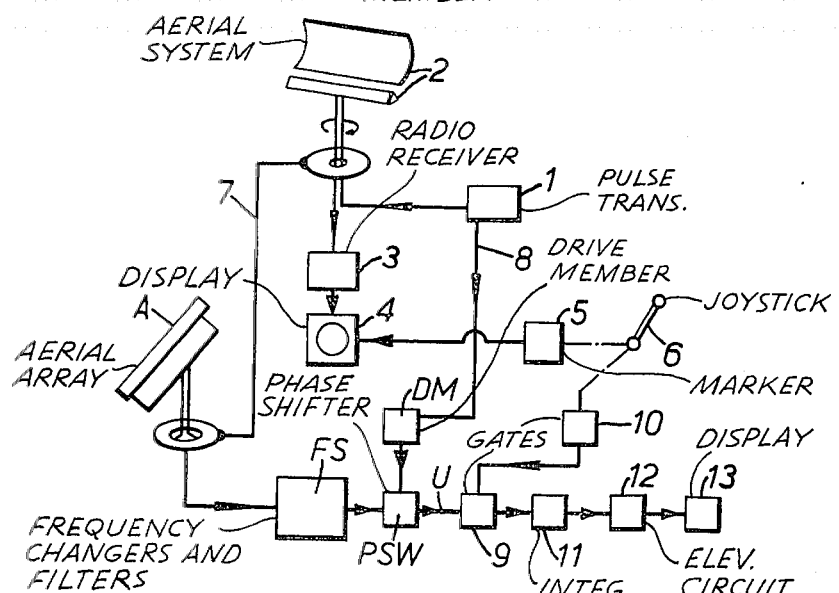
FIG. 6 represents diagrammatically a radar installation incorporating a height or elevation-finding radar in accordance with the invention.

The invention is illustrated in FIGS. 4, 5 and 6 of the accompanying drawings in which FIG. 4 is a view, similar in nature to that of FIG. 1, showing part of the receiver portion of a preferred embodiment of the invention; FIG. 5 similarly shows a modification; and FIG. 6 is a much simplified diagram of a radar installation which incorporates a height or elevation finding radar in accordance with the invention.

Referring to FIG. 4 the aerial array comprising the aerial elements $A_1$ to $A_n$, the frequency changing units $F_1$ to $F_n$ and the filters $S_1$ to $S_n$ are all as in FIG. 1 except that the element spacing is now chosen to satisfy the equation $\sin \theta/2 = \lambda/4d$ and the frequencies fed to the local oscillation terminals $LO_1$; $LO_2$; $LO_3$; $LO_4$ .... $LO_{n-1}$; $LO_n$ are respectively $f_o$; $f_o - \frac{1}{2} t$; $f_o - 1/t$; $f_o - 3/2$; ... $f_o - n-1/2t$; and $f_o - n/2t$. The outputs from filters $S_1, S_3, S_5 \ldots S_{n-1}$ are combined in one channel and those from the remaining alternate filters are combined in a second channel. In one of the two channels is inserted switchable phase shifting means capable, in one switching state, of introducing a phase shift of 180°. The switchable phase shifting means are represented diagrammatically in FIG. 4 by a phase shifter PS having two output terminals in the path to one of which there is zero phase shift and in the path to the other of which there is 180° phase shift, a change over switch SW and a drive member DM for changing over the switch once during each pulse length $t$. In practice, of course, the switch means would be electronic, e.g., constituted by high speed switching transistor circuits. The outputs from the two channels are combined and taken off for utilisation at U. As in FIG. 1 the bandwidth of each of the filters $S_1$ to $S_n$ is $1/t$. The phase shifting and switching means must be wide band enough to cover the whole band in which the narrow bands from $S_1$ to $S_n$ lie. As will now be seen FIG. 4 shows an embodiment in which the integer $K$, already mentioned, is 2.

FIG. 5 shows an embodiment in which the integer $K$ is 3. It is thought it will be found almost self-explanatory from the figure in view of the description of FIG. 4 already given. The differences from FIG. 4 are (1) the element spacing is now chosen to satisfy the equation $\sin \theta/2 = \lambda/6d$; the local oscillation frequencies fed in at $LO_1, LO_2, LO_3, LO_4 \ldots$ and so on are now respectively $f_o, f_o - \frac{1}{3}t, f_o - \frac{2}{3}t, f_o - 1/t \ldots$ and so on; and there are now three channels, one fed from filters $S_1, S_4, S_7 \ldots$ and so one, another fed from filters $S_2, S_5, S_8 \ldots$ and so on and the third fed from filters $S_3, S_6, S_9 \ldots$ and so on. Also there are two switchable phase shifters PS1 and PS2 one in each of two of the channels and each having three output terminals which give, in one case phase shifts of 0°, 120° and 240° (counting the terminals from left to right) and in the other case phase shifts of 0°, 240° and 120°. There are two ganged switches SW1 and SW2 gang-driven by the drive means DM. With the switches in the position shown the phase shifts given by PS1 and PS2 are, respectively, 120° and 240°. The outputs from the three channels are combined for utilization. It should be emphasized that although the aerial elements' spacings in FIGS. 1, 4 and 5 are shown as alike, this is only to simplify drawing and in fact the spacings are different in the three cases being differently chosen to comply with the different equations given for $\sin \theta/2$.

The radar installation represented in FIG. 6 comprises a pulse transmitter 1 which supplies pulses for transmission to a wave-guide and reflector aerial system 2 or other suitable well known directional aerial system which is rotated in azimuth and serves both for transmission and reception. Received echo pulses on this aerial system are fed to any suitable well known radar receiving equipment 3 and displayed on a display unit 4 — ordinarily a P.P.I. display unit. Associated with the display unit 4 is a marker equipment 5 controlled by a joy-stick control 6 whereby any desired target in the display can, by suitably positioning the joy-stick control, be marked, e.g., by an electronically produced ring encircling the selected desired target representation in the display. As so far described the installation is all well known and may take any suitable form well known per se.

For height finding or elevation determination the receiving part of a within-pulse radar in accordance with this invention is added. This comprises an aerial array, for example like that represented diagrammatically in FIG. 4 as comprising elements $A_1$ to $A_n$ spaced as described in connection with FIG. 4. This array is represented as a rotatable unit structure to which the reference A is applied in FIG. 6. This array is tilted back at an approximate angle — for example 13° to the vertical — and is rotated about a vertical axis in synchronism with the rotating aerial system 2. Any known suitable means represented merely by a synchronizing lead 7 may be used to ensure synchronized rotation of the two aerial systems 2 and A. Received signals on the array A are changed in frequency and filtered as already described in connection with FIG. 4 by apparatus represented by the block FS in FIG. 6. The phase shifting and switching apparatus PS and SW of FIG. 4 are represented by the block PSW of FIG. 6 and drive circuitry for actuating the switch is represented by the block DM of FIG. 4. This circuitry is synchronised with the pulse transmission in any suitable known way represented in FIG. 6 by the lead 8 between the blocks 1 and DM. The combined signal output obtained from the output lead U in FIG. 4 is fed to a gating circuit 9 which is controlled by any convenient known gate circuitry in block 10, this circuitry being in turn controlled by the joy-stick control 6 in such manner, and also as known per se, that the gate 9 is closed except when signals received from a marked target on the display unit 4 are being received. The gated output from 9 is integrated by an integrator 11, and passed to an elevation circuit 12 where the height information (if needed) and the elevation information it contains are extracted by the circuit at 12 and displayed by a display unit 13 all as known per se.

The following data is given as a non-limiting practical example of a height or elevation finding within-pulse radar as illustrated by FIG. 4 and which could be included in an installation as represented in FIG. 6:

Scanning angle ($\theta$) 26°
Tilt of aerial array 13° to the vertical
$\lambda = 10$ cms (3,000 Mc/s)
$t = 5$ $\mu$ secs
Aerial array: 50 horns spaced at 1.1$\lambda$ between centers
$f_o = 2,900$ Mc/s
Local oscillator frequency spacing 100 Kc/s
Full band width (to be accommodated by PS and SW) 5 Mc/s
Scanning lobe width 1.3°

I claim:

1. A within-pulse radar including an aerial array consisting of aerial elements so spaced from one another as substantially to satisfy the equation $\sin \theta/2 = \lambda/2Kd$; means for deriving, from the signals received upon the different elements, signals which differ from one another in frequency by $1/Kt$; $K$ signal channels fed with the derived signals, each of said channels being fed with signals derived from $1/K$ of said elements, the signals derived from adjacent elements being fed cyclically to different channels; phase switching means actuated at least once during each pulse length for simultaneously switching the phases of the signals in the channels in such manner that, at each switching operation, the phase in the channel switched thereby shifts by $2\pi/K$ or a multiple thereof, the shifts simultaneously produced in the different channels being different; and means for combining the signals obtained from the channels after phase switching to provide signals for utilization and target information determination: where $\theta$ is a predetermined angle of scan, $\lambda$ is the wave length, $d$ is the element spacing, $t$ is the pulse length, and $K$ is an integer greater than 1.

2. A within-pulse radar including an aerial array consisting of aerial elements spaced so as substantially to satisfy the equation $\sin \theta/2 = \lambda/4d$; as many frequency changers as there are elements each fed from a different element; means for applying to the frequency changers fed from adjacent elements local oscillation frequencies differing by one half the reciprocal of the pulse length, all the local oscillation frequencies being different; as many storage filters as there are frequency changers each fed from a different frequency changer; two signal channels, one fed from the filters following the frequency changers fed from alternate elements and the other fed from the remaining filters; a phase shifter providing a phase shift of $\pi$; means for switching said phase shifter into or out of one of the channels at least once in each pulse length; and means for combining the signals from the two channels to provide signals for utilization and target information determination.

3. A radar installation comprising a height or elevation finding within-pulse radar in accordance with claim 2, and further including both a known radar for finding and displaying target range and azimuth, and an azimuth rotating aerial system and wherein means, known per se, are provided for selecting individual displayed targets and gating means actuated by said selecting means are provided in a channel to which the utilization signals from said within-pulse Radar are fed so that said channel is opened only when signals from a selected target are received by the aerial array of the within-pulse radar which is rotated in azimuth synchronously with the aforesaid azimuth rotating aerial system.

4. A pulse radar in which an angular sector is scanned electronically over a time period equal to the duration $t$ of an interrogating pulse, comprising a serial array of spaced aerial elements, means for deriving, from the signals received from the different elements, signals which differ from one another in frequency, and means for combining the signals obtained from the elements to provide signals for utilization and target information determination, characterized in that the elements are grouped into $K$ channels ($K$ being an integer greater than 1), the first channel including the first, $(1+K)^{th}$, $(1+2K)^{th}$ ... aerial elements, the second channel including the second, the $(2+K)^{th}$, the $(2+2K)^{th}$ aerial elements and so on, in that the frequencies derived from adjacent aerial elements differ from one another by an amount equal to $1/Kt$ and in that phase switching means are provided for simultaneously changing the phases of the signals in the channels during each of said time periods of duration $t$, the phase change in any switched channel being $2\pi n/K$, where $n$ is an integer from 1 to $K-1$, the shift simultaneously produced in the different channels being different.

5. A pulse radar system in which an angular sector is scanned electronically over a time period equal to the duration $t$ of an interrogating pulse, comprising in combination:
   a serial array of spaced aerial elements adapted to receive target reflection signals;
   means for deriving output signals from the target reflection signals received by the different elements, said output signals differing from one another in frequency and being divided into $K$ channels, where $K$ is an integer equal to or greater than 2, such that the output signals from those elements which are separated by $K-1$ intervening elements of said serial array belong to a common channel;
   phase shifting means connected to each of said channels other than a first one thereof for shifting the corresponding output signals by $2\pi/K$ or a multiple thereof at least once during said time period of duration $t$ and such that the phase shift for any two phase-shifted channels is not the same; and
   means for combining the outputs of said first channel and of said phase shifting means to provide signals for utilization and target information determination.

\* \* \* \* \*